United States Patent Office 3,417,048
Patented Dec. 17, 1968

3,417,048
MASS-COLORATION PROCESS FOR
POLYESTER RESINS
Albert Charles Cooper, David Frederick White, and Donald Graham Wilkinson, Manchester, England, assignors to Imperial Chemical Industries Limited, London, England, a corporation of Great Britain
No Drawing. Filed Mar. 21, 1966, Ser. No. 535,663
Claims priority, application Great Britain, Mar. 26, 1965, 12,959/65
6 Claims. (Cl. 260—40)

ABSTRACT OF THE DISCLOSURE

Process for mass-coloring polyesters with quinaphthalone dyestuffs containing one or two carboxylic acid groups or esters thereof.

This invention relates to a coloration process and more particularly to a process for the mass coloration of synthetic linear polyesters, particularly polyethylene terephthalate.

In order for a colouring matter to be completely satisfactory for use in the mass coloration of synthetic linear polyesters it must fulfil the following requirements:

(1) It must be capable of withstanding the high temperature of the molten material (290° C.).

(2) It must not have a high volatility, otherwise it may sublime during the spinning process, causing irregular coloration, and fabrics subsequently subjected to pleating operations may lose colour strength or cause marking of adjacent fabric.

(3) It must have high fastness to light, and to the action of dry-cleaning solvents, perspiration and bleaches.

It has now been found that a class of heterocyclic dyestuff compounds is particularly valuable for the mass coloration of synthetic linear polyesters.

According to the invention there is provided a process for the mass coloration of synthetic linear polyesters which comprises using as colouring matter one or more dyestuffs of the formula:

R—X wherein X represents a group of the formula:

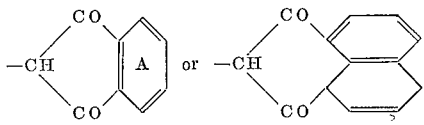

R represents a 5- or 6-membered nitrogen-containing heterocyclic ring having a heterocyclic nitrogen atom attached through a double bond to a carbon atom, of the said ring, to which X is attached, and which ring may contain substituents or form part of a fused ring system;

The benzene ring A may contain substituents or form part of a naphthalene nucleus;

At least one of X and R is substituted by at least one —COOY group, wherein Y represents hydrogen, alkyl, hydroxyalkyl, alkoxyalkyl or hydroxyalkoxyalkyl; and provided that A and R are free from sulphonic acid groups.

As examples of substituents which may be attached to the benzene ring A there may be mentioned chlorine or bromine atoms, lower alkoxy such as methoxy and ethoxy, lower alkyl such as methyl, nitro, or hydroxy groups. It is however preferred that the benzene ring A is substituted by a —COOY group.

As examples of the 5- or 6-membered heterocyclic rings represented by R there may be mentioned thiazole, oxazole, oxadiazole, pyrazole, triazole, pyridazine, pyrimidine, triazine, oxazine, and preferably, pyridine rings. As examples of the fused ring systems containing the ring R there may be mentioned benzoxazole, indazole, benziminazole, benzthiazole, naphthathiazole, quinazoline, quinoxaline, phthalazine, isoquinoline and, preferably, quinoline rings.

As examples of substituents other than a —COOY group which may be attached to R, there may be mentioned chlorine, bromine, hydroxyl, methyl and methoxy.

Throughout this specification the terms "lower alkyl" and "lower alkoxy" are used to denote alkyl and alkoxy radicals respectively containing from 1 to 4 carbon atoms.

The alkyl radicals represented by Y are preferably lower alkyl radicals such as methyl, ethyl, propyl and butyl radicals. The hydroxyalkyl radicals represented by Y are preferably mono- or di-hydroxy lower alkyl radicals such as β-hydroxyethyl, β- or γ-hydroxypropyl and β:γ-dihydroxypropyl radicals. The alkoxyalkyl radicals represented by Y are preferably lower alkoxy lower alkyl radicals such as β-ethoxyethyl and β- or γ-methoxypropyl radicals. The hydroxyalkoxyalkyl radicals represented by Y are preferably hydroxy lower alkoxy lower alkyl radicals such as β-(β'-hydroxyethoxy)ethyl and β- or γ-(γ'-hydroxypropoxy)propyl radicals.

The process of the invention can be conveniently carried out by incorporating one or more of the said dyestuffs into the synthetic linear polyesters by any of the known techniques for mass coloration of such materials. Thus the dyestuff in finely divided form may be coated onto chips of the polyester by tumbling and resulting coloured mixture subsequently melted and spun into filaments or shaped into solid objects. If desired, tumbling may be carried out with a dispersion of the dyestuff in a volatile liquid e.g. water or alcohol, or such a liquid may be used to moisten the mixture of dyestuff and polymer during the stage of tumbling. The volatile liquid is preferably removed by evaporation before melting. The dyestuff may also be incorporated with monomers or prepolymers at any convenient stage in the preparation of the polyester.

If desired the dyestuffs wherein Y represents a hydrogen atom can be used in the form of salts, such as the ammonium salts, which give rise to the free acids during the heat treatment required to melt the polyester.

As examples of synthetic linear polyesters which can be coloured by the process of the invention there may be mentioned polyesters which are obtained by the reaction of terephthalic acid with glycols of the formula HO—(CH$_2$)$_x$—OH wherein $x$ is an integer of from 2 to 10, or with 1:4-di(hydroxymethyl)cyclohexane. The term synthetic linear polyesters also includes copolyesters based on the said polyesters; such copolyesters being obtained by replacing a portion of the terephthalic acid by another acid or by a hydroxycarboxylic acid, and/or replacing a portion of the glycol by a different glycol.

The colorations produced by the process of the invention have good fastness to washing, pressure steaming, acid cross dyeing, perspiration, rubbing after steaming, dry heat treatments such as are used in pleating operations, and to light. It is also found that the colorations can be produced in heavy depths of shade, without impairing the properties of the synthetic linear polyesters or fibres derived therefrom.

The dyestuffs used in the process of the invention may be obtained by condensing a heterocyclic compound of the formula: —R'—CH$_3$ wherein R' represents a 5- or 6-membered nitrogen-containing heterocyclic ring having a heterocyclic nitrogen atom in ortho position to a carbon atom, of said ring, to which the methyl group is attached, and which ring may contain substituents or form part of a fused ring system, with an anhydride of the formula:

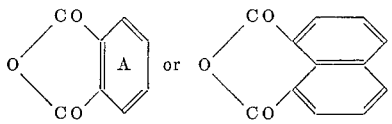

wherein A has the meaning stated, provided that the heterocyclic compound and the anhydride together contain at least one —COOY group. Alternatively the dyestuffs wherein Y represents other than a hydrogen atom can be obtained by esterifying the corresponding carboxylic acids (the dyestuffs wherein Y represents a hydrogen atom) with the appropriate alcohol.

As specific examples of the said heterocyclic compounds of the formula: —R'—CH$_3$ there may be mentioned 2-methylquinoline, 2:4-dimethylquinoline, 5- or 6-chloro-2-methylquinoline, α-picoline, 2-methylbenzthiazole and 2-methyl-1:3:5-triazine.

As specific examples of the said anhydrides there may be mentioned trimellitic anhydride, phthalic anhydride, 4-carboxy-1:8-naphthalic anhydride, 3- or 4-chlorophthalic anhydride, 4-carbomethoxyphthalic anhydride and 3- or 4-nitrophthalic anhydride.

If desired there can be used dyestuffs which contain in the molecule two systems of the formula:

R—X wherein R and X have the meanings stated, and as specific examples of such dyestuffs there may be mentioned the dyestuffs of the formulae:

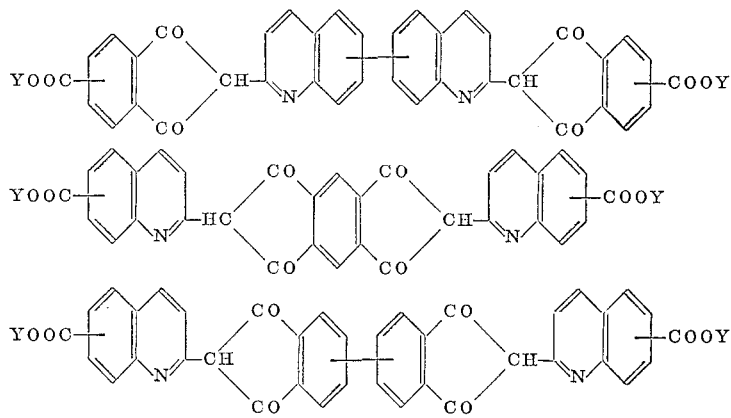

and

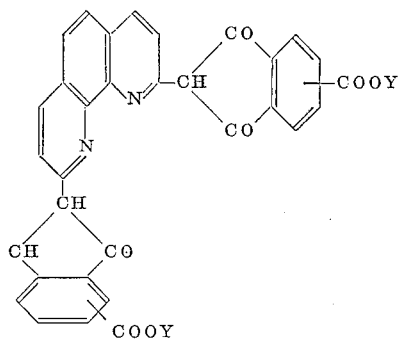

Many of the dyestuffs used in the process of the invention are new compounds, and according to a further feature of the invention there are provided the dyestuffs which are represented by the formula:

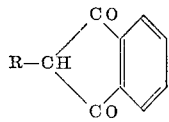

wherein R has the meaning stated above, the benzene ring can be optionally substituted by chlorine, bromine or nitro, and at least one of the benzene rings and R is substituted by at least one —COOY group.

A preferred class of dyestuffs for use in the process of the invention comprises the dyestuffs of the formula:

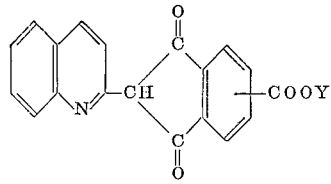

and the quinoline ring can be optionally substituted by chlorine atoms or methyl, hydroxyl or —COOY groups, and the dyestuffs of the formula:

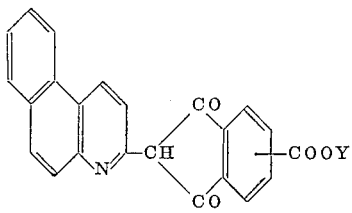

The invention is illustrated but not limited by the following examples in which the parts and percentages are by weight.

Example 1

A mixture of 15 parts of 2-methylquinoline and 21.3 parts of trimellitic anhydride is heated to 220° C. during 2 hours and maintained at this temperature for a further 4 hours. The mixture is then cooled, and the resulting solid is ground up and dissolved in 250 parts of a 10% aqueous solution of sodium carbonate. The solution is then filtered, the filtrate is acidified with hydrochloric acid, and the precipitated solid is filtered off, washed with water and dried.

On analysis the dyestuff is found to contain 71.6% of carbon, 3.5% of hydrogen and 4.4% of nitrogen. $C_{19}H_{11}O_4N$ requires 71.9% of carbon, 3.4% of hydrogen and 4.4% of nitrogen.

Example 2

1 part of the dyestuff of Example 1 in powder form is tumbled with 100 parts of polyethylene terephthalate in the form of chips. The resulting mixture is then melt spun in known manner to produce fibres of a deep greenish-yellow colour and excellent fastness properties.

Example 3

A mixture of 10.2 parts of 2-methyl-3-hydroxyquinoline-4-carboxylic acid, 15.5 parts of trimellitic anhydride and 100 parts of o-dichlorobenzene is stirred at the boil under a reflux condenser for 18 hours. The mixture is then cooled to 20° C., and the precipitated dyestuff is filtered off, washed with benzene and dried.

1 part of the above dyestuff in powder form and 3 parts of β-ethoxyethanol are tumbled with 100 parts of polyethylene terephthalate in the form of small granules until a uniform mixture results. The coloured mixture is dried at 120° C. in a vacuum, and is then melt spun to give fibres of a strong greenish-yellow shade and good fastness properties.

Example 4

100 parts of dimethyl terephthalate, 71 parts of ethylene glycol and 0.05 part of manganese acetate are stirred together for 4 hours at 197° C., during which time about 33 parts of methanol distil off from the mixture. To this mixture is then added 0.04 part of phosphorous acid and 0.05 part of antimony trioxide and 3 parts of 5-carbomethoxy quinphthalone which has previously been wetted out by ball milling for 30 minutes in the presence of 12 parts of ethylene glycol. The temperature of the mixture is then increased to 277° C. and the pressure is reduced to 0.3 mm. of mercury and the heating is continued under these conditions for a further 6 hours, whilst the excess ethylene glycol distils off. The melt is then formed into filaments which are subsequently drawn out into fibres. The fibres so obtained are coloured a greenish-yellow shade possessing excellent fastness properties.

Example 5

100 parts of dimethyl terephthalate, 71 parts of ethylene glycol, 0.05 part of manganese acetate and 3 parts of 5-carbomethoxy quinphthalone are stirred for 4 hours at 197° C., during which time about 33 parts of methanol are distilled off. 0.04 part of phosphorous acid and 0.05 part of antimony trioxide are then added, and the temperature of the mixture is then increased to 277° C., the pressure is reduced to 0.3 mm. of mercury and heating is continued under these conditions for a further 6 hours whilst the excess ethylene oxide is distilled off. The mixture is then formed into filaments which are subsequently drawn out into fibres. The resulting fibres are coloured a greenish-yellow shade possessing excellent fastness properties.

The 5-carbomethoxyquinphthalone used in this example was obtained by treating 5-carboxyquinphthalone with thionyl chloride and reacting the resulting acid chloride with methanol.

The following table gives further examples illustrating the process of the invention which may be carried out by methods similar to those described in Examples 2 to 5 above but using the dyestuffs obtained by reacting the heterocyclic compounds listed in the second column of the table with the anhydrides or acids listed in the third column of the table. The fourth column of the table indicates the shades of the resulting fibres.

fibres are coloured in greenish-yellow shades having excellent fastness properties.

The dyestuff used in this example was obtained by reacting the sodium salt of quinphthalone-5-carboxylic acid with ethylene dichloride at 140° C. in the presence of diethylamine.

Example 20

In place of the β-hydroxyethyl ester of quinphthalone-5-carboxylic acid used in Example 19 there are used equivalent amounts of (a) the β-ethoxyethyl ester of quinphthalone-5-carboxylic acid,
(b) the β-hydroxyethyl ester of 3'-hydroxyquinphthalone-5-carboxylic acid,
(c) the β-hydroxyethyl ester of

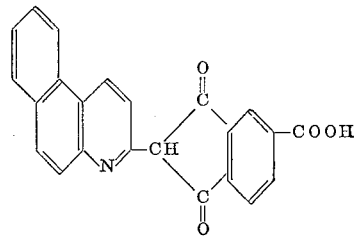

or (d) the β-(β'-hydroxyethoxy)ethyl ester of quinphthalone-5-carboxylic acid whereby yellow fibres of excellent fastness properties are obtained.

The dyestuffs (b) and (c) were obtained by reacting the sodium salt of the corresponding carboxylic acid with ethylene chlorohydrin at 140° C. in the presence of diethylamine; the dyestuff (a) was obtained by reacting quinphthalone-5-carboxylic acid with thionyl chloride and treating the resulting product with β-ethoxyethanol, while the dyestuff (d) was obtained by reacting the sodium salt of quinphthalone-5-carboxylic acid with β-(β'-hydroxyethoxy)ethyl chloride.

We claim:

1. Process for the mass coloration of synthetic linear polyesters which comprises mixing at least one dyestuff of the formula

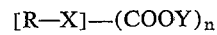

wherein X is selected from the class consisting of groups of the formulae

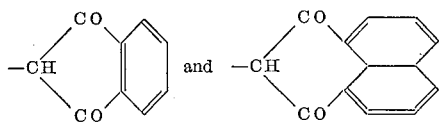

R is a nitrogen-containing heterocyclic ring system selected from the class consisting of quinoline, benz-

| Example | Heterocyclic Compound | Anhydride or Acid | Shade |
|---|---|---|---|
| 6 | 2-methylbenzo-(5:6)quinoline | Trimellitic anhydride | Yellow. |
| 7 | 6-chloro-2-methylquinoline | do | Do. |
| 8 | 6-bromo-2-methylquinoline | do | Do. |
| 9 | 2-methylbenzimidazole | do | Do. |
| 10 | 2-methylbenzthiazole | do | Do. |
| 11 | 2-methylnaphtho-(2':1':4:5) thiazole. | do | Do. |
| 12 | 6-chloro-2-methylbenzthiazole | do | Do. |
| 13 | 2:4-dihydroxy-6-methy-1:3:5-triazine. | do | Do. |
| 14 | 6:6'-di(2-methylquinolyl) | do [1] | Do. |
| 15 | 2:6-dimethylquinoline | Hemimellitic anhydride | Do. |
| 16 | 2-methylquinoline | 4-hydroxyhemimellitic anhydride. | Do. |
| 17 | 2-methyl-3-hydroxyquinoline | Hemimellitic anhydride | Do. |
| 18 | 2-methylquinoline | Naphthalene-1:4:5-tricarboxylic acid. | Greenish-yellow. |

[1] 2 molecular proportions.

Example 19

In place of the dyestuffs used in any of Examples 2 to 5 there are used equivalent amounts of the β-hydroxyethyl ester of quinphthalone-5-carboxylic acid whereby the imidazole, benzquinoline, benzthiazole, naphthothiazole, 1:3:5-triazine and diquinolyl, which is attached to X through a carbon atom in ortho position to a nitrogen atom present in said heterocyclic ring, and any further substituents on R are selected from the class consisting of hydroxy, lower alkyl having 1–4 carbon atoms, chlorine and bromine;

Y is selected from the class consisting of hydrogen, lower alkyl having 1–4 carbon atoms, hydroxy lower alkyl having 1–4 carbon atoms, lower alkoxy lower alkyl wherein each of the alkoxy and alkyl moieties has 1–4 carbon atoms, and hydroxy lower alkoxy lower alkyl wherein each of the alkoxy and alkyl moieties has 1–4 carbon atoms;

n is a positive integer from 1 to 2; with the said polyester and subsequently melting the mixture and shaping it into a solid object.

2. Process as claimed in claim 1 wherein there is used a dyestuff of the formula:

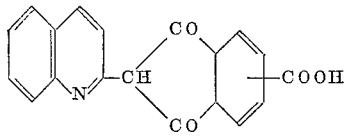

3. Process as claimed in claim 1 wherein there is used a dyestuff of the formula:

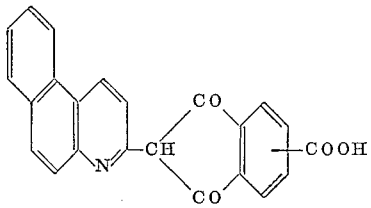

4. Process for the mass coloration of synthetic linear polyesters which comprises mixing with the polyester forming ingredients at least one dyestuff of the formula:

[R—X]—(COOY)$_n$ wherein X is selected from the class consisting of groups of the formulae:

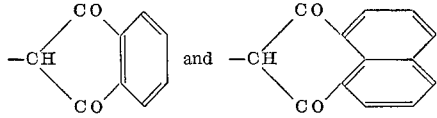

R is a nitrogen-containing heterocyclic ring system selected from the class consisting of quinoline, benzimidazole, benzquinoline, benzthiazole, naphthothiazole, 1:3:5-triazine and diquinolyl, which is attached to X through a carbon atom in ortho position to a nitrogen atom present in said heterocyclic ring, and any further substituents on R are selected from the class consisting of hydroxy, lower alkyl having 1–4 carbon atoms, chlorine and bromine;

Y is selected from the class consisting of hydrogen, lower alkyl having 1–4 carbon atoms, hydroxy lower alkyl having 1–4 carbon atoms, lower alkoxy lower alkyl wherein each of the alkoxy and alkyl moieties has 1–4 carbon atoms and hydroxy lower alkoxy lower alkyl wherein each of the alkoxy and alkyl moieties has 1–4 carbon atoms;

n is a positive integer from 1 to 2;

polymerizing the resulting mixture and shaping it into a solid object.

5. The process as claimed in claim 4 wherein there is used a dyestuff of the formula:

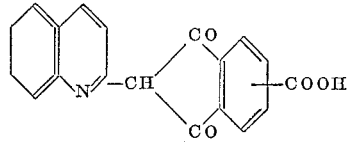

6. The process as claimed in claim 4 wherein there is used a dyestuff of the formula:

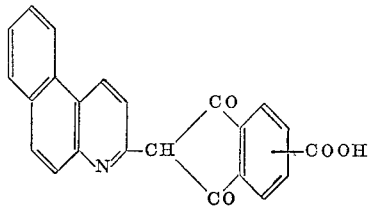

References Cited

UNITED STATES PATENTS

| | | |
|---|---|---|
| 2,955,902 | 10/1960 | Merian. |
| 3,036,077 | 5/1962 | Altermatt. |
| 3,103,403 | 9/1963 | Eaton et al. _____ 260—309.6 |
| 3,104,233 | 9/1963 | Altermatt. |
| 3,228,780 | 1/1966 | Grelat. |
| 3,242,179 | 3/1966 | Christmann et al. _____ 260—40 |

MORRIS LIEBMAN, *Primary Examiner.*

L. T. JACOBS, *Assistant Examiner.*